US007006788B1

(12) United States Patent
Warren

(10) Patent No.: US 7,006,788 B1
(45) Date of Patent: Feb. 28, 2006

(54) METHOD AND SYSTEM FOR PREVENTING SUN TRANSIT OUTAGES IN POINT-TO-MULTIPOINT SATELLITE SYSTEMS

(75) Inventor: Richard H. Warren, Rockville, MD (US)

(73) Assignee: Dyncorp Information Systems LLC, Reston, VA (US)

( * ) Notice: Subject to any disclaimer, the term of this patent is extended or adjusted under 35 U.S.C. 154(b) by 0 days.

(21) Appl. No.: 09/216,036

(22) Filed: Dec. 18, 1998

Related U.S. Application Data

(63) Continuation-in-part of application No. 08/988,989, filed on Dec. 11, 1997.

(51) Int. Cl.
*H04B 7/85* (2006.01)
(52) U.S. Cl. ..................................... 455/12.1; 342/359
(58) Field of Classification Search .............. 455/12.1, 455/13.1, 13.3, 25, 427, 428, 32, 13.2, 8, 455/9, 14, 15, 3.02, 63.4; 342/359, 354, 342/350, 75, 74
See application file for complete search history.

(56) References Cited

U.S. PATENT DOCUMENTS

| | | | | |
|---|---|---|---|---|
| 3,836,969 | A | * | 9/1974 | Bond et al. .................. 343/100 |
| 4,334,226 | A | | 6/1982 | Eguchi et al. ............... 343/100 |
| 4,979,170 | A | | 12/1990 | Gilhousen et al. ........ 370/104.1 |
| 5,258,764 | A | | 11/1993 | Malinowski ................. 342/359 |
| 5,319,673 | A | | 6/1994 | Briskman ....................... 375/1 |
| 5,364,049 | A | | 11/1994 | Long | |
| 5,485,485 | A | * | 1/1996 | Briskman et al. ........... 375/200 |
| 5,497,167 | A | | 3/1996 | Luoma | |
| 5,507,025 | A | | 4/1996 | Rodeffer ...................... 455/266 |
| 5,539,730 | A | | 7/1996 | Dent | |
| 5,572,216 | A | | 11/1996 | Weinberg et al. | |
| 5,585,804 | A | * | 12/1996 | Rodeffer ...................... 342/359 |
| 5,602,838 | A | | 2/1997 | Kartalopoulos ............. 370/406 |
| 5,642,122 | A | | 6/1997 | Lockie et al. ................ 343/881 |
| 5,642,358 | A | | 6/1997 | Dent | |
| 5,839,053 | A | * | 11/1998 | Bosch et al. ................ 455/13.1 |
| 5,914,942 | A | | 6/1999 | Hassan et al. | |
| 5,940,753 | A | * | 8/1999 | Mallinckrodt ............... 455/422 |
| 5,970,085 | A | * | 10/1999 | Yi ............................... 375/200 |
| 5,999,127 | A | | 12/1999 | Dezelan | |
| 6,023,616 | A | * | 2/2000 | Briskman .................... 455/344 |

OTHER PUBLICATIONS

Declaratory Order in the matter of Routine Licensing of Earth Stations . . . , Federal Communications Commission Record, 2FCC Rcd vol. 8, DA 87-391, pp. 2149-2152 and attachment.

"Small Satellite Antennas," Bruce A. Blevins, http://www.lascruces.com/-testaantennas/antpaper.html, 19 Pages.

* cited by examiner

*Primary Examiner*—Melody Mehrpour
(74) *Attorney, Agent, or Firm*—McDermott Will & Emery LLP

(57) ABSTRACT

A geostationary communication satellite system that uses a hub and spoke configuration, where the hub includes at least one relatively large diameter satellite antenna. The hub of the communication system is capable of receiving satellite communication signals even when the sun transits within the beamwidth of its primary antenna by either redirecting its primary antenna toward a secondary satellite, or switching to a secondary antenna directed toward a secondary satellite.

5 Claims, 8 Drawing Sheets

400

┌─────────────────────────────────┐
│ ALIGN ONE OF THE PLURALITY OF   │─── 402
│ EARTH STATIONS TO ILLUMINATE A  │
│ PLURALITY OF SATELLITES         │
└─────────────────────────────────┘
                ↓
┌─────────────────────────────────┐
│ GENERATE A                      │─── 404
│ COMMUNICATION SIGNAL            │
└─────────────────────────────────┘
                ↓
┌─────────────────────────────────┐
│ RECEIVE THE                     │
│ COMMUNICATION SIGNAL            │─── 406
│ AT THE PLURALITY OF             │
│ SATELLITES                      │
└─────────────────────────────────┘
                ↓
┌─────────────────────────────────┐
│ BROADCAST A RETURN              │
│ SIGNAL FROM THE                 │─── 408
│ PLURALITY OF                    │
│ SATELLITES                      │
└─────────────────────────────────┘
                ↓
┌─────────────────────────────────┐
│ RECEIVE THE RETURN              │
│ SIGNAL FROM ONLY ONE OF         │─── 410
│ THE SATELLITES AT THE           │
│ CENTRAL EARTH STATION           │
└─────────────────────────────────┘

*FIG. 4*

METHOD AND SYSTEM FOR PREVENTING SUN TRANSIT OUTAGES IN POINT-TO-MULTIPOINT SATELLITE SYSTEMS

RELATED APPLICATIONS

This application is a continuation-in-part of application Ser. No. 08/988,989, filed Dec. 11, 1997, which is hereby incorporated in its entirety by reference.

FIELD OF THE INVENTION

The present invention relates to geostationary satellite communication antenna. In particular, it relates to small diameter C-band geostationary satellite antenna.

BACKGROUND OF THE INVENTION

FIG. 1 shows a geostationary communication satellite system $100$ comprising a plurality of satellites $102_1$ to $102_i$ orbiting the earth $104$. Satellite $102_1$ is separated from adjacent satellites $102_2$ and $102_3$ by approximately a 2° arc (the arc is shown by the separation between the dashed lines on each of FIGS. 1, 2, 5, and 6, and is typical for geostationary satellites in the United States). Earth $104$ has a plurality of earth stations $106_1$ to $106_n$. Each earth station $106$ includes a satellite transmitting and receiving antenna $108$. Communication system $100$ operates when antenna $108$ generates a communication signal $110$ that is received by, for example, satellite $102_1$, and visa versa.

As communication signal $110$ travels from, for example, earth station $106_1$ to its intended destination at satellite $102_1$ it spreads over an area $112$. If communication signal $110$ spreads beyond the 2° arc between satellite $102_1$ and the adjacent satellites $102_2$ and $102_3$, then all three satellites $102_1$, $102_2$, and $102_3$ would process communication signal $110$ as if it was intended for them. One reason this occurs is that communication signal $110$ does not experience significant signal attenuation at the edge of area $112$. In order to prevent satellites $102_2$ and $102_3$ from processing communication signal $110$, antenna $108$ generates a narrow beam communication signal, instead of a wide beam communication signal.

The most widely used radio frequency bands for satellite communication are the Ku- and C-bands. In both of these bands, a conventional parabolic reflector antenna generates a narrow communication signal to prevent adjacent satellites from processing communication signals not intended for them. The parabolic reflector antenna for the Ku-band may have a relatively small diameter. The small parabolic reflector antenna provides an efficient, cost-effective mechanism for allowing an earth station to communicate with an individual satellite. Unfortunately, Ku-band radio signals attenuate in atmospheric conditions consistent with periods of moderate-to-heavy precipitation, i.e., rain, sleet, or snow. In most cases, providing facilities with sufficient power to compensate for severe signal attenuation is uneconomical. As a result, satellite communications systems operating in the Ku-band experience periodic system outages that are unacceptable for time critical applications.

To avoid periodic system outages due to atmospheric conditions, earth stations typically transmit and receive data using C-band radio frequencies. These frequencies are much less susceptible to attenuation due to precipitation. Therefore, C-band transmitters can economically provide sufficient signal margin to overcome any signal attenuation due to atmospheric conditions. Unfortunately, to generate narrow communication signal beams, C-band parabolic antennas need to be larger than Ku-band antennas. In fact, the minimum C-band parabolic antenna diameter that prevents communication signal $110$ from interfering with satellites $102_2$ or $102_3$ (See FIG. 1) is approximately 3.7 meters. For many applications, however, the installation of a 3.7 meter diameter antenna is too unwieldy, aesthetically unseemly, and/or not structurally prudent. Therefore, it would be desirable to use smaller diameter parabolic reflective antenna to transmit C-band radio frequencies while avoiding unnecessary interference with adjacent satellites.

Further, during short periods of each day for several days immediately before and after the vernal and autumnal equinoxes, the sun transits behind geostationary satellites as seen from an earth station's receiving antenna (i.e., from the perspective of the earth station, the sun passes behind the geostationary satellite). The sun emits a great deal of energy in the form of electromagnetic radiation in the bandwidth occupied by radio wave communications. Therefore, when the sun is located within the beamwidth of the receiving antenna, its energy causes interference in the form of radio frequency noise. This noise causes a decrease in the signal-to-noise ratio of the earth station's receiver, and can render the earth station inoperative until the sun completes its transit of the antenna's beamwidth.

Because the relative movement of the earth with respect to the sun is known to a high degree of precision, satellite communication system operators are forewarned of the time when the sun will transit the beamwidth of a receiving antenna. Knowledge of a pending problem, however, is only useful if the system operators can keep the system operational during these periods.

For conventional satellite systems, each individual receive antenna might be effected by the sun's positioning during this period. Some conventional systems use costly terrestrial communications facilities to provide continuing operations as the sun transits behind a satellite with respect to its earth station's receiving antenna. Other systems remain off-the-air for the duration of these periods. The inherent inconvenience of this option, however, renders it particularly unattractive. Finally, some conventional satellite systems continue operation by switching each earth station's antenna to a secondary satellite during the period that the sun is within the beamwidth of the antenna. This process requires manual intervention and/or complex automated mechanical mechanisms to perform the daily repositioning of the antenna during its sun transit outage. The cost of the daily repositioning of each antenna so effected renders this option uneconomical.

Therefore, a need exists for a satellite communication system to efficiently provide communication during sun transit outages.

SUMMARY OF THE INVENTION

Systems and methods consistent with the present invention address this need by providing a mechanism for repositioning an earth station's antenna during a sun transit outage. Alternatively systems and methods consistent with the present invention provide a second antenna at the earth station directed toward a second satellite.

In accordance with the purpose of the invention, as embodied and broadly described herein, a point-to-multipoint satellite communication system, comprises a first satellite antenna for generating a wide beam communication signal to illuminate a plurality of satellite, means for generating a return communication signal from each of the plurality of satellites, a second satellite antenna for receiving the return communication signal from only one of the plurality of satellites, and a satellite antenna repositioning system for repositioning said second antenna when the sun transits within the beamwidth of said second antenna.

Both the foregoing general description and the following detailed description are exemplary and explanatory, and are intended to provide further explanation of the invention as claimed.

BRIEF DESCRIPTION OF THE DRAWINGS

The accompanying drawings, which are incorporated in and constitute a part of this specification, illustrate preferred embodiments of the invention and, together with the description, explain the goals and principles of the invention. In the drawings.

FIG. 4 is a flow chart illustrating the transmission operation of the communication system of FIG. 2;

DESCRIPTION OF THE PREFERRED EMBODIMENT

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide efficient and continuous communications during sun transit outages by providing a secondary channel for communications to continue during the outages.

Communication systems consistent with the present invention comprise a "hub and spoke" configuration. In this configuration, a central earth station acts as the hub and a plurality of earth stations act as the spokes. Communication from the central earth station to any one of the plurality of earth stations is direct in that it involves a single transmission to the satellite and a single transmission from the satellite. Communication between spokes, however, is not direct. A transmitting earth station communicates with the central earth station, which retransmits the signal to a receiving earth station. In this case, there are two transmissions to a satellite and two transmissions from a satellite.

Figure 1:
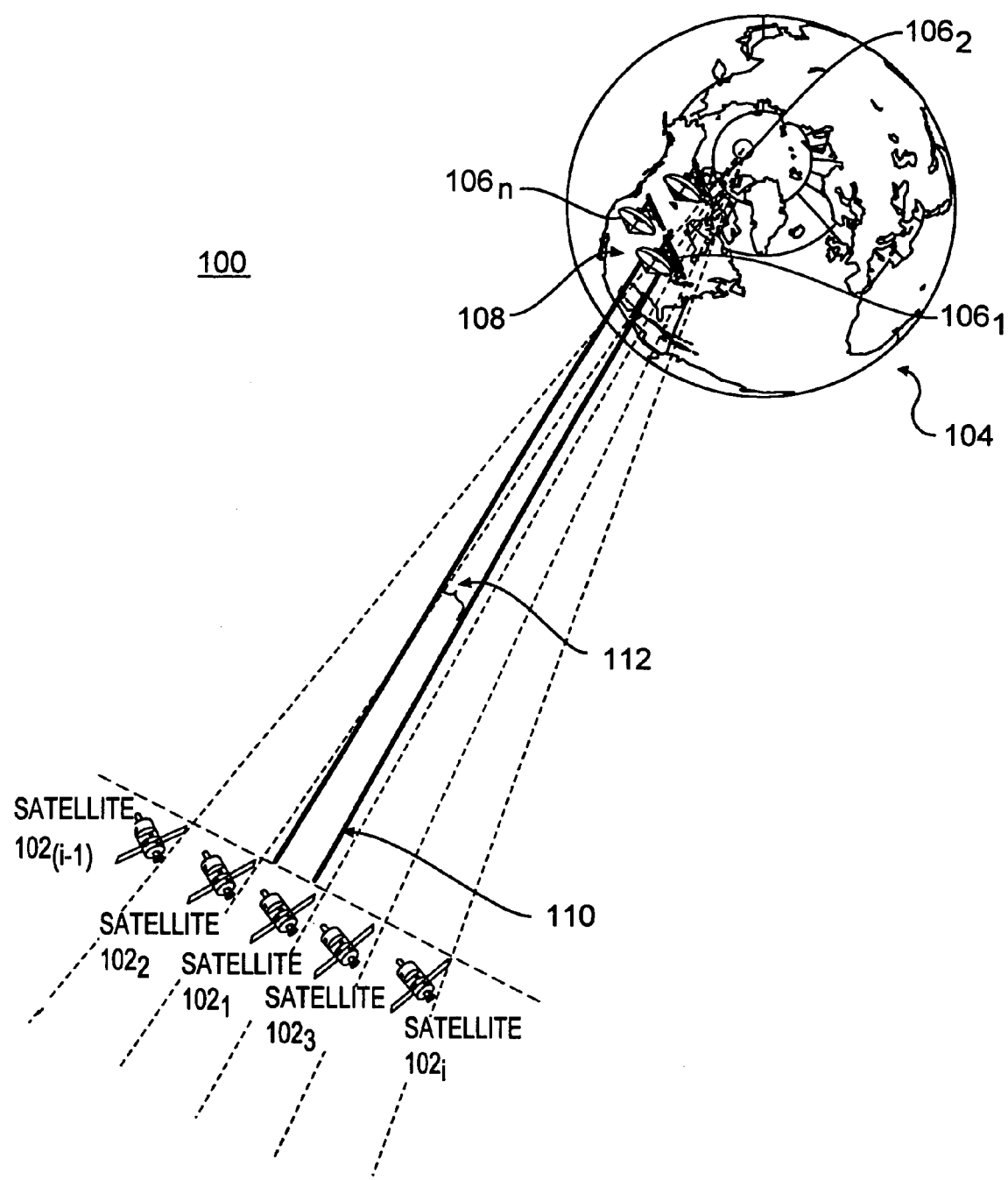
FIG. 1 is an illustration of a geostationary satellite communication system.
Figure 2:
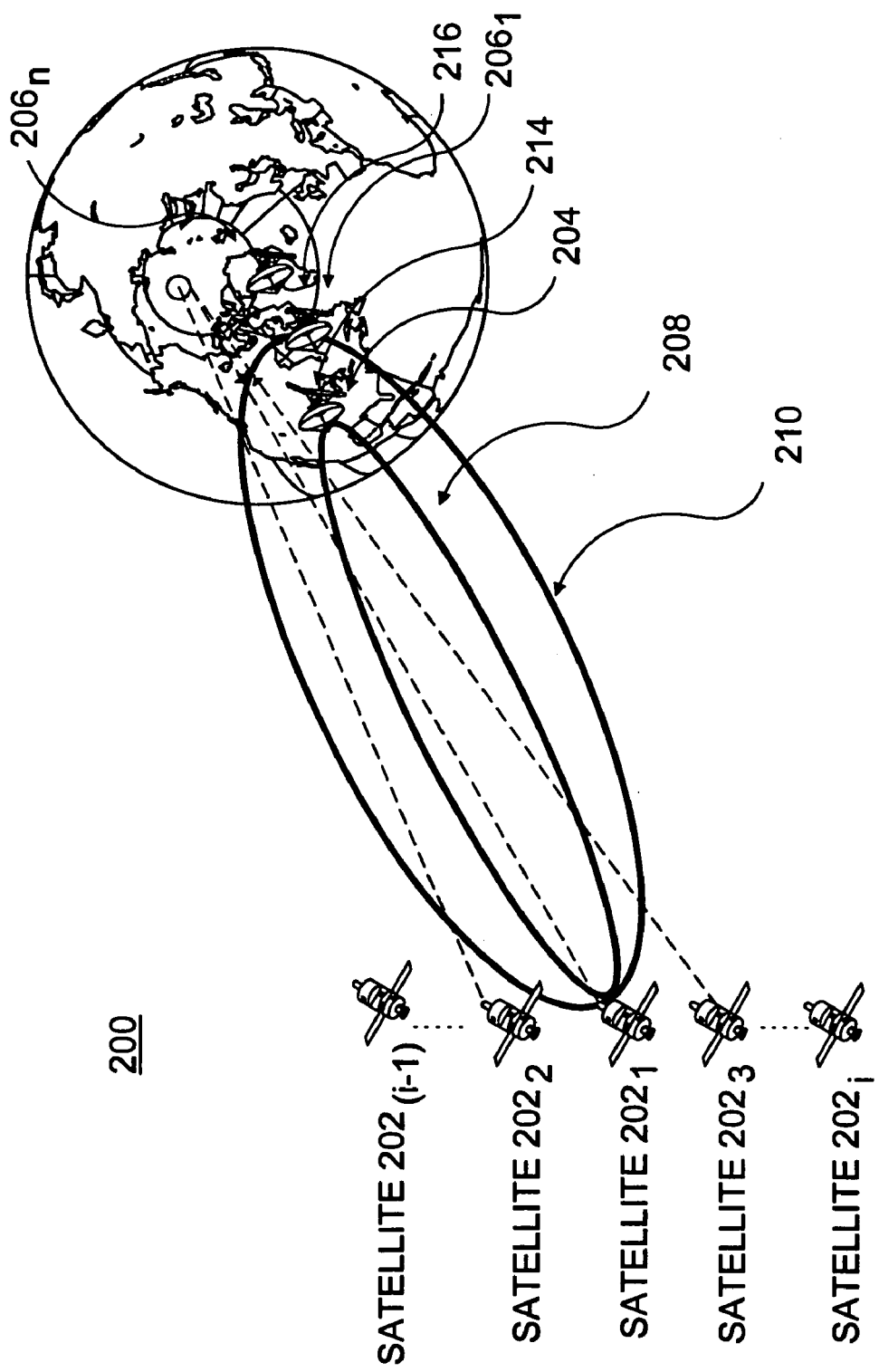
FIG. 2 is an illustration of a geostationary satellite communication system consistent with the present invention.

FIG. 2 is a diagram of satellite communication system 200 that uses a relatively small diameter C-band antenna (also called a very small aperture terminal (VSAT) antenna) for the transmission and reception of communication signals. System 200 includes a plurality of satellites $202_1$ to $202_i$, a central earth station 204, and a plurality of earth stations $206_1$ to $206_n$. Central earth station 204 transmits to the plurality of satellites 202 via a communication signal 208. Each of the earth stations 206 transmits to the plurality of satellites 202 via a communication signal 210. Each of the satellites 202 communicates with central earth station 204 and the plurality of earth stations 206 with a return communication signal (not shown).

Central earth station 204 includes a relatively large C-band antenna 214 having a relatively narrow beamwidth. Conversely, each of the plurality of earth stations 206 includes a relatively small C-band antenna 216 having a relatively wide beamwidth.

Figure 3:
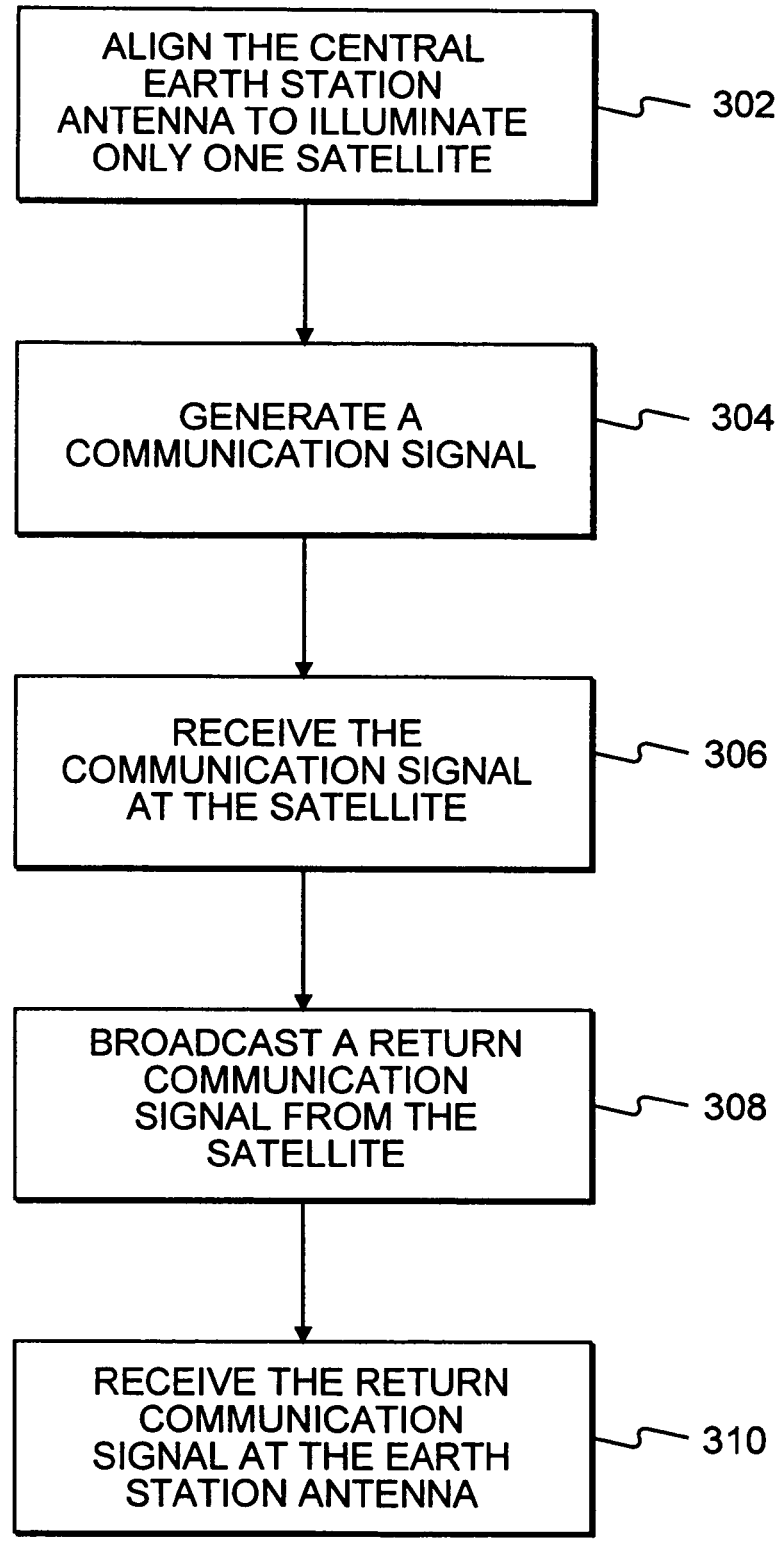
FIG. 3 is a flow chart illustrating the reception operation of the communication system of FIG. 2.

FIG. 3 is a flow chart 300 of a return communication from one of the satellites 202 to antenna 216. First, central earth station 204 aligns its narrow beam antenna 214 to illuminate a single satellite 202, for example satellite $202_1$ (step 302). Next, antenna 214 generates a narrow communication signal 208 (step 304), which is received solely by satellite $202_1$ (step 306). Based on communication signal 208, satellite $202_1$ broadcasts a return communication signal (step 308). Antenna 216 receives the return communication signal (step 310).

FIG. 4 is a flow chart 400 illustrating the transmission of a communication signal 210 from antenna 216 to the plurality of satellites 202. First, one of the earth stations 206 aligns its antenna 216 to illuminate satellite $202_1$ (step 402). Next, antenna 216 generates a relatively wide communication signal 210 (step 404), which is received by satellite $202_1$, along with the other satellites within the gain pattern of signal 210, such as satellites $202_2$ and $202_3$ (step 406). In response to communication signal 210, each of the satellites broadcasts return communication signals (step 408). Due to its narrow beamwidth, however, antenna 214 receives the return communication signal from the single satellite at which it is pointed (i.e., satellite $202_1$).

During transmission from antenna 216, both satellites $202_2$ and $202_3$ receive communication signal 210. Due to its wide beamwidth, antenna 216 receives return communication signals from all three satellites $202_1$, $202_2$ and $202_3$, though it is pointed only towards satellite $202_1$. In the above example, when antenna 216 is aligned with satellite $202_1$, it can receive return communication signals from each of satellites $202_1$, $202_2$, and $202_3$.

If an antenna outside communication system 200 mistakenly illuminates a satellite within system 200, the received signal is seen by system 200 as an interference signal ("interference signal" is defined as a communication signal generated by an antenna outside a communication system that operates on the same frequency band). The illuminated satellite retransmits the signal to antenna 216, because the satellite does not distinguish the source of the signal.

Similarly, when antenna 216 illuminates satellites $202_1$, $202_2$, and $202_3$ with communication signal 210, each of satellites $202_1$, $202_2$, and $202_3$ transmits a return communication signal. An antenna outside of communication system 200 that is aligned with one of the satellites would receive the return communication signal. In order to avoid these types of interference, it is preferable to obtain exclusive use, on satellites $202_1$, $202_2$, and $202_3$, of the particular frequencies that communication system 200 will use.

Figure 5:
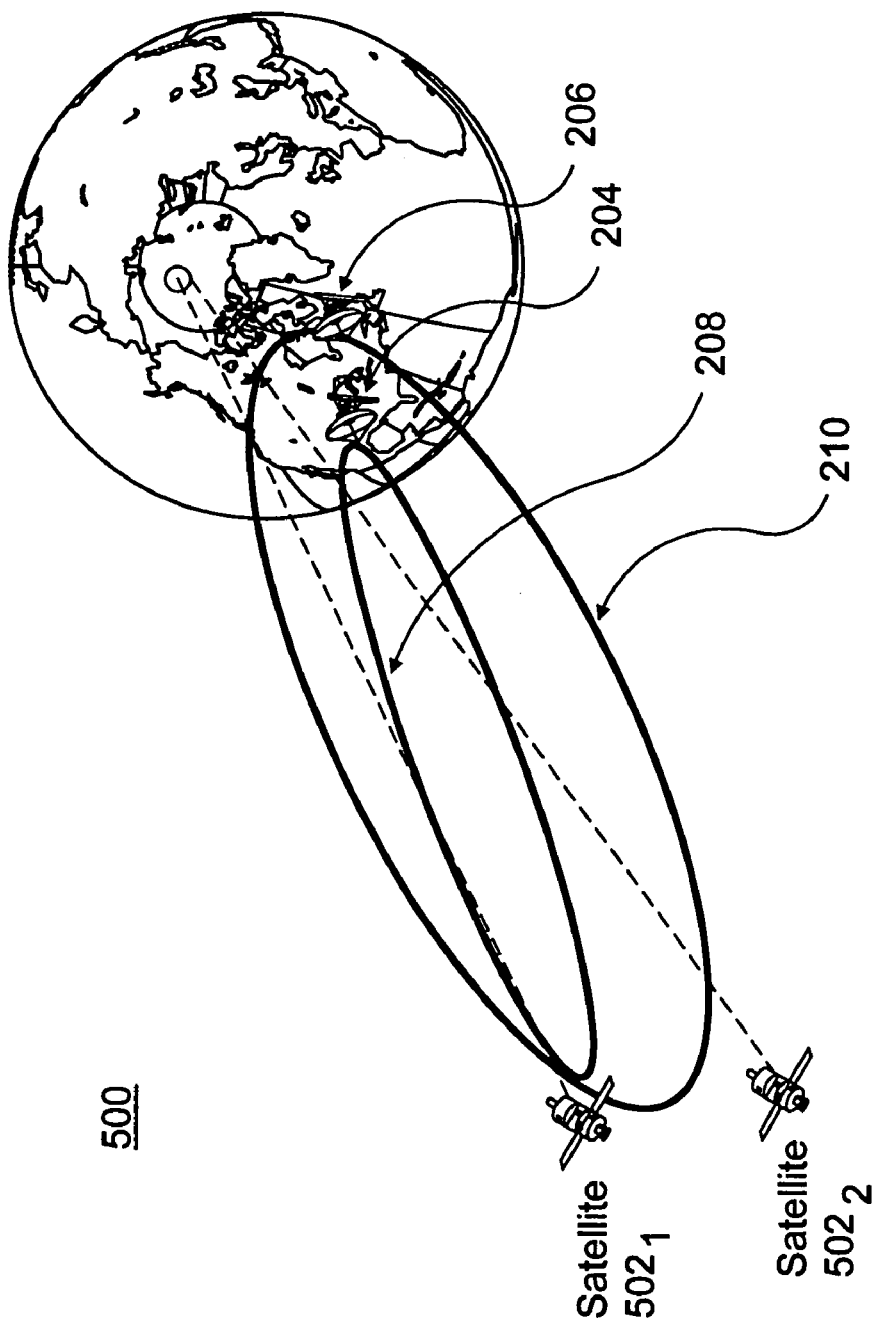
FIG. 5 is an illustration of a second geostationary satellite communication system consistent with the present invention.
Figure 6:
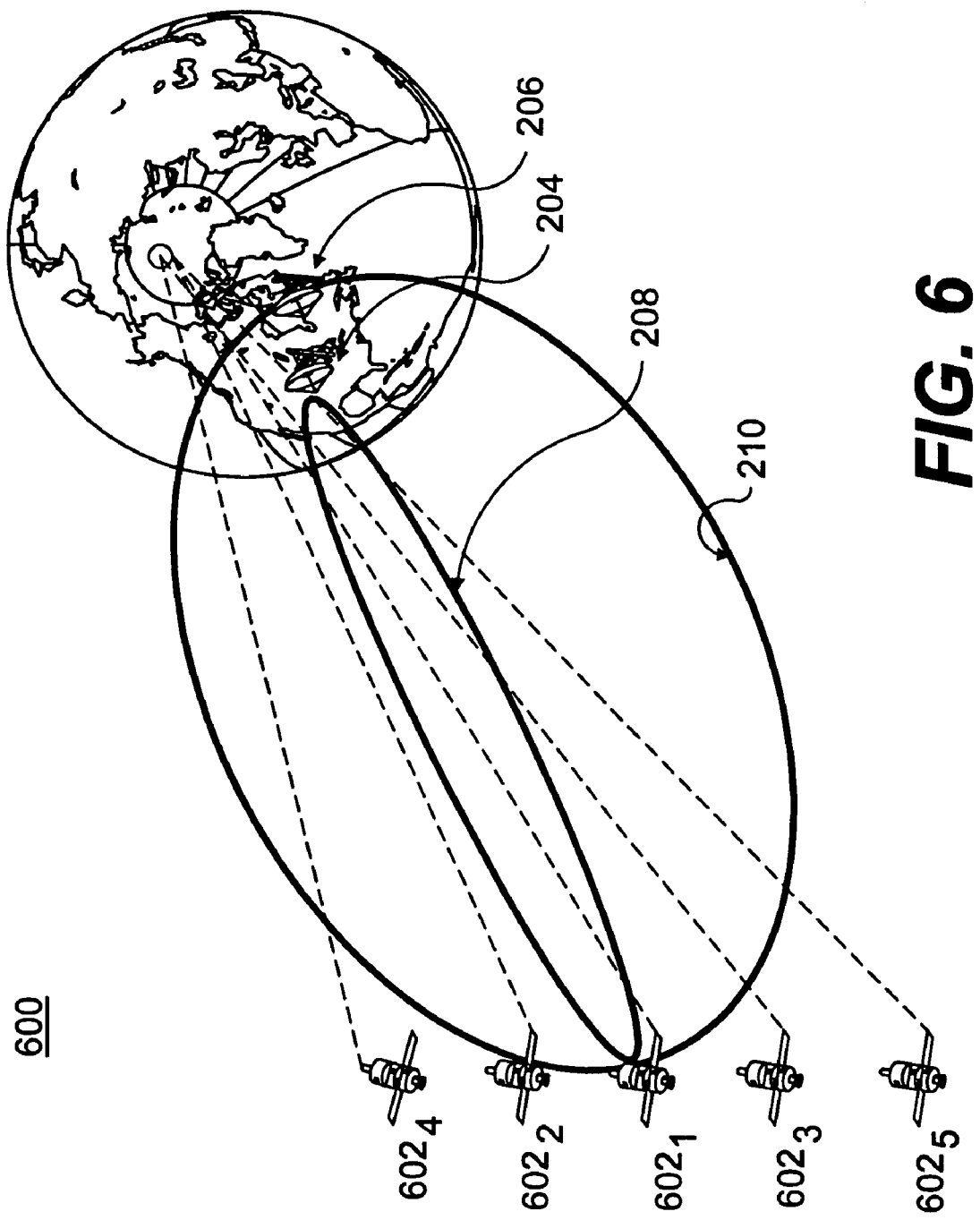
FIG. 6 is an illustration of a third geostationary satellite communication system consistent with the present invention.

Although the disclosure is directed to a communication system with a central and two adjacent satellites, virtually any number of satellite configurations are possible. For example, FIG. 5 shows a communication system 500 that uses two satellites $502_1$, and $502_2$. FIG. 6 shows a communication system 600 that uses five satellites $602_1$, $602_2$, $602_3$, $602_4$, and $602_5$. Communication systems 500 and 600 both operate in a manner similar to system 200 described above.

As noted above, it is preferable to exclude other satellite communication systems from using the bandwidth employed by communication system 200. However, it is not possible to control the frequencies emitted by the sun as it transits behind satellites 202 with respect to the earth. Large C-band antennas, such as antenna 214, are particularly sensitive to the noise signal emitted by the sun. This sensitivity is caused by the amplification of the sun signal received within the narrow beamwidth of the large antenna. Smaller VSAT antennas 216 do not receive as large a noise signal due to the lower level of amplification of the signal received within their wide beamwidth.

Sun transit outage is of particular concern to operators of large point-to-multipoint (hub and spoke) satellite systems as described herein. In these hub and spoke type networks, such as system 200, all communications necessarily pass through hub antenna 214 of central earth station 204. During the transit of the sun through the beamwidth of antenna 214, the entire system becomes inoperative.

Figure 7:
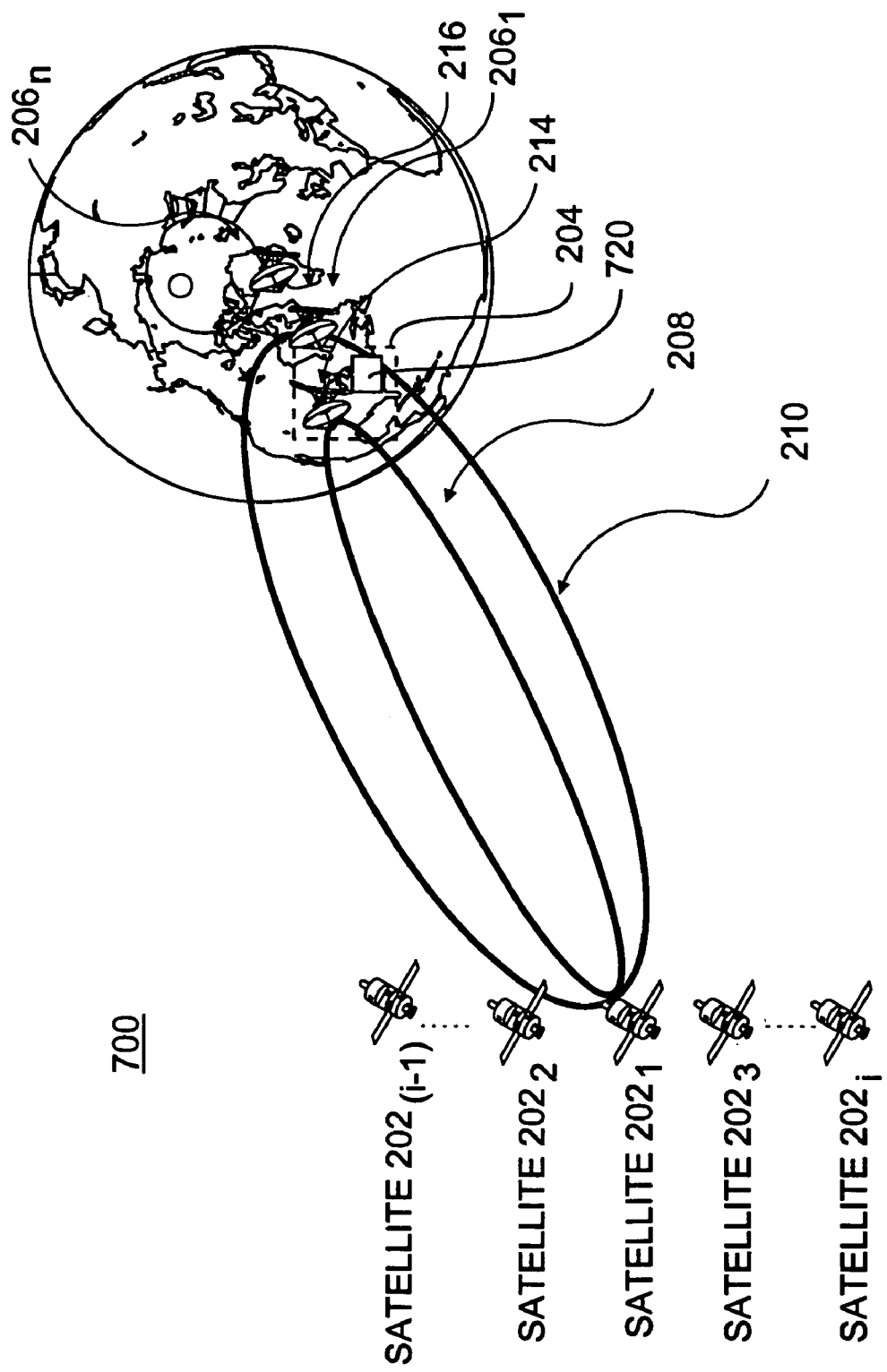
FIG. 7 is an illustration of a fourth geostationary satellite communication system consistent with the present invention.

FIG. 7 is a diagram of a satellite communication system 700 that includes a satellite antenna repositioning system 720 to overcome the problem of sun transit outages. Because relatively small C-band antenna 216, or VSAT antenna, has a relatively wide beamwidth, antenna 216 communicates with several satellites, including, for example, satellites $202_1$, $202_2$, and $202_3$. Upon receiving a signal 210 from antenna 216, each of satellites $202_1$, $202_2$, and $202_3$ broadcasts a return communication signal. During the period that the sun passes through the beamwidth of antenna 214 (i.e., behind satellite $202_1$), satellite antenna repositioning system 720 repositions antenna 214 to point to one of the proximate secondary satellites $202_2$ or $202_3$. As noted above, due to the relatively wide beamwidth of antennas 216, they remain in operation while the sun transits their beamwidths. Following the repositioning, therefore, antenna 214 can both transmit signals to and receive signals from antennas 216.

Figure 8:
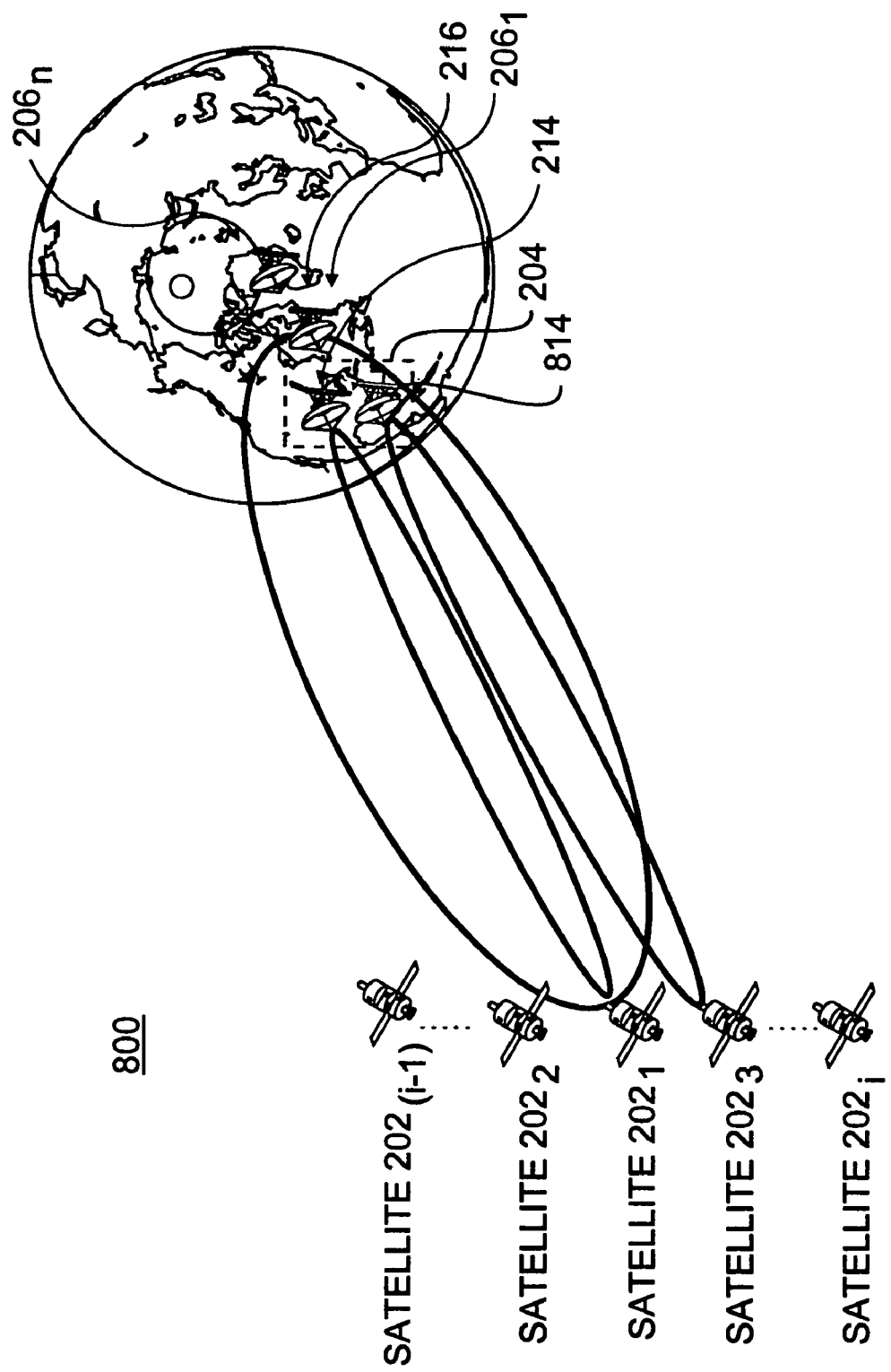
FIG. 8 is an illustration of a fifth geostationary satellite communication system consistent with the present invention.

FIG. 8 is a diagram of a satellite communication system 800, which includes a second relatively large C-band antenna 814 installed at the central earth station 204. Station 204 directs antenna 214 at satellite $202_1$, and antenna 814 at one of the proximate secondary satellites $202_2$ or $202_3$. During the period of transit of the sun behind satellite $202_1$ with respect to antenna 214, central earth station 204 discontinues use of antenna 214 and switches to antenna 814. The operation of switching from one antenna to another is performed by an antenna switch selector (not shown). Once again, because of the relatively wide beamwidth of antenna 216, the sun does not have as large an effect on the signal-to-noise ratio of the received signal as the sun transits within the beamwidths of antennas 216. The relatively wide beamwidths of antennas 216 also results in the illumination of satellites $202_1$, and proximate secondary satellites $202_2$, and $202_3$. The communication link between antenna 216 and central earth station 204 is thereby maintained during the sun transit of the beamwidth of satellite $202_1$ by receiving the signal from a proximate secondary satellite using antenna 814.

It will be apparent to those skilled in the art that various modifications and variations can be made in the methods and apparatus consistent with the present invention without departing from the scope or spirit of the invention. Other modification will be apparent to those skilled in the art from consideration of the specification and practice of the invention disclosed herein. The specification and examples should be considered as exemplary only, with the true scope and spirit of the invention being indicated by the following claims.

What is claimed is:

1. A point-to-multipoint satellite communication system, comprising:
    a first directional satellite antenna for generating a wide beam communication signal to illuminate a plurality of satellites;
    means for generating a return communication signal from each of the plurality of satellites;
    a second satellite antenna, directed to a first one of the plurality of satellites, for receiving said return communication signal from said first satellite; and
    a third satellite antenna, directed to a second one of the plurality of satellites located proximate to said first satellite, for receiving said return communication signal from said second satellite only during sun transit outages of said second antenna.

2. The system of claim 1, wherein a diameter of the second and third satellite antennas are greater than a diameter of the first satellite antenna.

3. A method of performing satellite communication in a point-to-multipoint communications system,
    comprising the steps of:
    aligning a first satellite antenna to illuminate a plurality of satellites;
    transmitting a communication signal from the first satellite antenna to said plurality of satellites;
    broadcasting a return signal from each of said plurality of satellites based on the transmitted communication signal;
    aligning a second satellite antenna to receive the return signal from only a first one of the plurality of satellites;
    repositioning said second satellite antenna to receive the return signal from only a second of the plurality of satellites during periods when the sun transits behind said first satellite; and
    receiving the return signal from said second satellite at said second satellite antenna during said periods.

4. A method of performing satellite communication in a point-to-multipoint communication system, comprising the steps of:
    aligning a first antenna to illuminate a plurality of satellites;
    transmitting a communication signal from said first antenna to the plurality of satellites;
    broadcasting a return signal from each of the plurality of satellites in response to the communication signal;
    aligning a second antenna to receive the return signal from a first one of the plurality of satellites;
    receiving the return signal from said first satellite at said second antenna when the sun is outside the beamwidth of said second antenna;
    aligning a third antenna to receive the return signal from a second one of the plurality of satellites; and
    receiving the return signal from said second satellite with said third antenna when the sun is within the beam width of said first satellite.

5. An earth station for use in a point-to-multipoint communication system including a small satellite antenna for transmitting a wide beam communication signal and a plurality of adjacent geostationary satellites for retransmitting the communication signal from the small satellite antenna, the earth station comprising;

a first large satellite antenna directed to a first one of the plurality of adjacent geostationary satellites;

a second large satellite antenna directed to a second one of the plurality of adjacent geostationary satellites; and a receiver for receiving communication signals at one of the said first and second antennas, said receiver including an antenna switch selector for selectively activating said first and said second antennas, the selector activating the second antenna only during periods when the sun transits within a beamwidth of said first antenna.

* * * * *